United States Patent [19]

Honsberg

[11] Patent Number: 4,745,147
[45] Date of Patent: May 17, 1988

[54] VULCANIZABLE CHLORINATED POLYETHYLENE COMPOSITIONS

[75] Inventor: Wolfgang Honsberg, Wilmington, Del.

[73] Assignee: E. I. Du Pont de Nemours and Company, Wilmington, Del.

[21] Appl. No.: 923,166

[22] Filed: Oct. 24, 1986

[51] Int. Cl.[4] .................. C08K 5/05; C08L 23/06; C08F 8/34

[52] U.S. Cl. .................. 524/386; 524/190; 524/387; 524/388; 524/587; 525/331.5; 525/334.1; 525/341; 525/346; 525/350

[58] Field of Search ............ 525/331.5, 334.1, 346, 525/350, 341; 524/190, 386, 387, 587, 388

[56] References Cited

U.S. PATENT DOCUMENTS

| 3,321,423 | 5/1967 | Scullin et al. | 524/399 |
| 3,355,423 | 11/1967 | Scullin et al. | 524/291 |
| 4,288,576 | 9/1981 | Richwine | 525/349 |
| 4,357,446 | 11/1982 | Matoba | 525/331.5 |
| 4,499,244 | 2/1985 | Honsberg | 525/334.1 |
| 4,524,185 | 5/1985 | Hinderer | 525/328.2 |
| 4,551,505 | 11/1985 | Sauerbier et al. | 525/346 |

FOREIGN PATENT DOCUMENTS 57-149357 12/1982 Japan .
59-227946 12/1984 Japan .

*Primary Examiner*—Herbert J. Lilling

[57] ABSTRACT

A curable composition comprising chlorinated polyethylene containing 20 to 50 weight percent chlorine, from 0.75 to 3 parts per 100 parts by weight chlorinated polyethylene of a polymercapto compound such as 2,5-dimercapto-1,3,4-thiadiazole, from 0.5 to 20 parts by weight per 100 parts by weight chlorinated polyethylene of an acid acceptor such as magnesium oxide, from 0.25 to 10 parts by weight per 100 parts chlorinated polyethylene of a polyhydric alcohol. Preferably the composition contains an initiator which is an amine, quaternary ammonium compound or a phosphonium compound.

10 Claims, No Drawings

VULCANIZABLE CHLORINATED POLYETHYLENE COMPOSITIONS

BACKGROUND OF THE INVENTION

1. Field of the Invention

The present invention relates to curable compositions based on elastomeric chlorinated polyethylene containing a polymercapto compound such as 2,5-dimercapto-1,3,4-thiadiazole, aliphatic polyhydroxy compounds, an inorganic acid acceptor and a quaternary phosphonium salt, or a quaternary ammonium salt, or an amine.

2. Prior Art

U.S. Pat. No. 4,288,576 discloses crosslinking chlorinated polyethylene using 2,5-dimercapto-1,3,4-thiadiazole and certain basic materials such as amines.

U.S. Pat. No. 4,524,185 discloses the use of 2,5-dimercapto-1,3,4-thiadiazole to improve the properties of halogen-containing elastomers.

U.S. Pat. No. 4,551,505 discloses the crosslinking of chlorinated polyethylene with 2,5-dimercapto-1,3,4-thiadiazole in the presence of a basic substance.

Japanese patent application Publication No. 57-149357 discloses a vulcanizable composition comprising a chlorine containing polymer, sulfur and/or a sulfur donor, a polyhydric hydroxyl compound, a quaternary ammonium salt and/or quaternary phosphonium salt and calcium hydroxide.

Japanese patent application Publication No. 59-227946 discloses a vulcanizable composition comprising a halogen-containing polymer; 2,3-dimercapto pyrazine; 2,3-dimercapto quinoxaline or derivatives thereof; a quaternary ammonium salt and/or a quaternary phosphonium salt; and an inorganic acid acceptor compound.

SUMMARY OF INVENTION

The present invention provides a chlorinated polyolefin composition that can be cured quickly and at moderate temperatures to vulcanizates having superior heat resistance. More specifically, this invention is directed to curable chlorinated polyolefin elastomer compositions, based on a combination of: (a) chlorinated polyethylene having a chlorine content from 20–50% by weight, (b) a basic metal oxide or hydroxide as acid acceptor, (c) an initiator of the cure, such as an amine or certain amine derivatives as well as phosphonium salts, (d) crosslinking agents such as 2,5-dimercapto-1,3,4-thiadiazole (DMT) or certain derivatives of it and (e) aliphatic polyhydroxy alcohols such as pentaerythritol or sorbitol. The vulcanizates based on these formulations can be used for jacketing electrical wires and making hose.

DETAILED DESCRIPTION OF INVENTION

In industry chlorinated polyolefins are usually cured with peroxides, resulting in vulcanizates with excellent properties. However, most of the peroxides are expensive and require high cure temperature. Therefore, other curing agents have been suggested, such as 2,5-dimercapto-1,3,4-thiadiazole (DMT) or sulfur and sulfur donating compounds commonly used in the rubber industry. However, these proposed formulations for the cure of chlorinated polyethylene suffer from a variety of deficiencies; the DMT-based cure requires a fair amount of magnesium oxide or similar acid acceptors which are detrimental to heat aging.

The present invention provides a curable chlorinated polyethylene composition that provides superior heat resistance.

The chlorinated polyolefin that may be used in this invention can be any of those well known elastomers prepared by the reaction of chlorine or chlorine generating agents with a hydrocarbon polymer, such as polyethylene, or a copolymer of ethylene with a $C_3$–$C_8$ alpha-olefin. The polyethylene can be either the lower density-high pressure type or the higher density homo- or copolymer type prepared with a coordination catalyst at lower pressure. The ethylene copolymers used for the chlorination can contain up to about 20% by weight of $C_3$–$C_8$ comonomers. The average molecular weight of the chlorinated polyolefin is usually at least 10,000; it is obtained by chlorinating a polyolefin and is carried out in such a way that the polymer product contains 20–50% weight percent chlorine. The chlorination can be carried out in solution, suspension, or in the absence of any liquid reaction medium.

The chlorinated polyethylene used in this invention has between 20–50% chlorine by weight, usually 35% chlorine, and is therefore elastomeric.

The acid acceptor employed in this invention is usually magnesium oxide but other conventional basic metal oxides and hydroxides can be used. The amount of acid acceptor is in the range of 0.5 to 20 phr; the preferred amount, which will provide the optimum properties, depends on the individual curing recipe. If the formulation contains a fair amount (1–10 phr) of an activating polyhydroxy compound, then about 2 phr of magnesium oxide are desirable.

Any of various mercapto compounds containing 2 to 4 mercapto groups and having a molecular weight of less than 500 can be used. Preferred mercapto compounds are 2,5-dimercapto-1,3,4-thiadiazole or monoester derivatives thereof. Another suitable mercapto compound is trithiocyanuric acid. The preferred amount of mercapto compound is 0.75 to 3 parts by weight per 100 parts by weight elastomer. Other crosslinking agents such as sulfur can also provide a cure but are not preferred because they not only require a stronger base, such as calcium hydroxide, but also result in vulcanizates which exhibit poor compression set and inferior heat resistance.

The polyhydric alcohols used as curing aids in the composition of the present invention are added to the elastomer compounded stocks in amounts of about 0.25 to 10 parts per hundred chlorinated polyethylene; the preferred amount is between 0.75 and 3 parts per hundred elastomer. The polyhydroxy compounds are aliphatic alcohols with at least two hydroxyl groups that are in steric proximity to each other, usually in the 1,2 or 1,3 or 1,4 position to each other, and have molecular weights of less than 600. The aliphatic alcohol may be substituted with other groups such aromatic or heterocyclic groups. The preferred aliphatic alcohols contain 2 to 12 carbon atoms. If less than 0.2 parts per hundred parts of elastomer are used, then little effect on the state of cure and heat aging is observed. If the amount of the polyhydroxy compound exceeds 10 parts per hundred, no further benefit is achieved.

Preferably the aliphatic polyhydroxy alcohols contain 2 to 6 carbon atoms. Polyhydroxy alcohols that can be used include 2,2-dimethyl-1,3-propanediol, ethylene glycol, glycerol, 1,2-propanediol, dipentaerythritol, and pentaerythritol (available as PE-200, a technical grade sold by Hercules, Inc.).

The composition has to also contain an amine, quaternary amine or phosphonium compound as initiator.

The amine most frequently recommended is a dihydro derivative of pyridine.

The quaternary ammonium or phosphonium salts used in this invention are represented by the following general formulae:

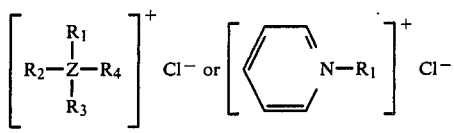

In the above general formula, Z is N or P; $R_1$, $R_2$, $R_3$, and $R_4$ may be the same or different from each other and selected from $C_{1-17}$ alkyl, cyclohexyl, phenyl, and benzyl groups.

The above $C_{1-17}$ alkyl groups, for example are methyl, propyl, butyl, hexyl, heptyl, octyl, decyl, dodecyl, hexadecyl groups and the like. These quaternary ammonium salts or phosphonium salts are used singly or in mixtures. The quaternary salts are specifically tetrabutyl ammonium chloride, benzyltriethyl ammonium chloride, dodecylpyridinium chloride, tetrabutylphosphonium chloride, triethylhexadecylphosphonium chloride, ethyltrioctylphosphonium chloride, triethylhexyl ammonium chloride, tricapryl methyl ammonium chloride and the like. Thus, the amines useful herein are amines which exhibit cationic surfactant activity. Typical of the amines suitable for use as initiator is N-phenyl-3,5-diethyl-2-propyl-1,4-dihydropyridine.

The chlorinated polyethylene compound can and usually does contain conventional fillers such as carbon black, calcium carbonate or clay; pigments, such as titanium dioxide, plasticizers, for example aromatic oils or esters, as well as stabilizers are also frequently present. Their amounts are dictated by the intended use of the vulcanizates and have little bearing upon the results of this invention.

The invention is illustrated by the following examples in which the parts are given in weight per hundred parts of chlorinated polyethylene.

EXAMPLE 1

One hundred parts of chlorinated polyethylene (35 weight percent Cl) was compounded with 30 parts SRF carbon black, 2 parts magnesium oxide, 3 parts "PE 200" pentaerythritol, 2.5 parts of a derivative of 2,5-dimercapto-1,3,4-thiadiazole commercially available as Echo ® S and 0.8 part N-phenyl-3,5-diethyl-2-propyl-1,4-dihydropyridine on a rubber mill at 60° C. for 4 minutes. The stock was sheeted off the mill and test specimens were died out and then cured for 30 minutes under pressure at 160° C. Stress-strain properties were measured according to ASTM D-412. Compression set was measured according to ASTM D-395, Method B. Results for this sample are shown in Table I—Example 1A.

Three other samples and associated test specimens were prepared as described for Example 1A with the following changes: Sample 1B contained 4 parts sorbitol in place of pentaerythritol. Sample 1C contained 10 parts magnesium oxide and no "PE-200" and Sample 1D contained no "PE-200". Results are reported in Table I.

TABLE I

Effect of Polyhydroxy Alcohols On Heat Aging of Vulcanizates

| | Example 1A | Example 1B | Comparative Example 1C | Comparative Example 1D |
|---|---|---|---|---|
| Chlorinated Polyethylene (35 wt % Cl) | 100 | 100 | 100 | 100 |
| SRF Carbon Black | 30 | 30 | 30 | 30 |
| Magnesium Oxide | 2 | 2 | 10 | 2 |
| "PE-200" Pentaerythritol | 3 | — | — | — |
| Sorbitol | — | 4 | — | — |
| DMT derivative* | 2.5 | 2.5 | 2.5 | 2.5 |
| amine** | 0.8 | 0.8 | 0.8 | 0.8 |
| Cured 30 Minutes at 160° C. | | | | |
| Stress-Strain Properties (ASTM D-412) | | | | |
| Original | | | | |
| $M_{100}$ (MPa) | 3.2 | 3.3 | 3.9 | 3.4 |
| $T_B$ (MPa) | 25.5 | 26.0 | 24.7 | 26.3 |
| $E_B$ (%) | 450 | 420 | 415 | 460 |
| Heat Aged 70 Hrs/150° C. | | | | |
| $M_{100}$ (MPa) | 5.1 | 4.6 | 8.4 | 6.1 |
| $T_B$ (MPa) | 23.8 | 23.6 | 25.3 | 22.4 |
| $E_B$ (%) | 290 | 290 | 230 | 250 |
| % Retention of $E_B$ | 64 | 69 | 55 | 54 |
| Heat Aged 7 Days/150° C. | | | | |
| $M_{100}$ (MPa) | 8.8 | 7.6 | — | 11.2 |
| $T_B$ (MPa) | 21.3 | 20.3 | 15.8 | 18.8 |
| $E_B$ (%) | 190 | 195 | 70 | 155 |
| % Retention of $E_B$ | 42 | 46 | 17 | 34 |
| Compression Set After 22 Hrs/70° C. (ASTM D-395, Method B) | | | | |
| % | 16.5 | 17.7 | 18.6 | 21.3 |

*Echo ® S
**N—phenyl-3,5-diethyl-2-propyl-1,4-dihydropyridine

Example 1A represents the present invention and shows the improvement in heat aging by addition of pentaerythritol. In Example 1A, 42% of the original elongation at break is retained. This improvement is even more remarkable since the increased heat resistance is accompanied by an improvement in compression set resistance. Example 1B represents a formulation which contains an alternative polyhydroxy alcohol, i.e., sorbitol. Heat aging is excellent. Compression set is also good. Example 1C represents a typical prior art formulation. After aging for 7 days at 150° C., the % EB retention is only 17%. Although some improvement in heat resistance can be achieved by reducing the level of magnesium oxide acid acceptor from 10 to 2 phr as shown in 1D, the value of % $E_B$ retention of 34 after 7 days is still significantly lower than that of the composition of the invention.

EXAMPLE 2

Additional compounded samples were prepared as in Example 1. Results are reported in Table II.

TABLE II

| | Example 2A | Example 2B |
|---|---|---|
| Chlorinated Polyethylene (35 weight percent Cl) | 100 | 100 |
| SRF Carbon Black | 30 | 30 |
| Magnesium Oxide | 2 | 2 |
| DMT derivative* | 2.5 | 2.5 |
| Benzyltriphenylphosphonium Chloride | 1 | — |
| amine** | — | 0.8 |
| "PE-200" Pentaerythritol | 3 | 3 |

TABLE II-continued

|  | Example 2A | Example 2B |
| --- | --- | --- |
| Oscillating Disk Rheometer 30 Min./160° C. | | |
| $M_H$ (Nm) | 4.6 | 4.6 |
| t'90 (min) | 6.0 | 6.5 |
| Vulcanizate Properties (Cured 30 Min./160° C.) | | |
| Compression Set (22 Hrs/70° C.) | | |
| % | 18.2 | 16.5 |

*Echo ® S
**N—phenyl-3,5-diethyl-2-propyl-1,4-dihydropyridine

EXAMPLE 3

This example demonstrates the improvement in heat aging by addition of pentaerythritol using a phosphonium salt as initiator. Compounded samples were prepared as in Example 1 by milling 100 parts by weight of chlorinated polyethylene (35 weight percent Cl) with 30 parts by weight SRF carbon black, 2.5 parts Echo ® S, 2 parts magnesium oxide and 1 part benzyltriphenylphosphonium chloride. In addition, Example 3B also used 3 parts pentaerythritol (the invention) whereas none was used in Example 3A (the control). The physical properties of the two formulations before and after heat aging are reported in Table III.

TABLE III

|  | Example 3A | | Example 3B | |
| --- | --- | --- | --- | --- |
| ODR (30 min/160° C.) | | | | |
| $M_H$ (N·m) | 4.1 | | 4.9 | |
| $t_s2$ (min) | 2.7 | | 1.7 | |
| t'90 (min) | 21.5 | | 7.0 | |
| Stress/Strain Properties (Cured 30 min/160° C.) | | | | |
| Original | | | | |
| $M_{100}$ (psi) (MPa) | 330 | 2.3 | 370 | 2.5 |
| $M_{200}$ (psi) (MPa) | 950 | 6.5 | 950 | 6.5 |
| $T_B$ (psi) (MPa) | 3150 | 21.7 | 3450 | 23.8 |
| $E_B$ (%) | 505 | | 515 | |
| Heat Aged (7 Days/121° C.) | | | | |
| $M_{100}$ (psi) (MPa) | 480 | 3.3 | 400 | 2.7 |
| $T_B$ (psi) (MPa) | 3350 | 23.1 | 3450 | 23.8 |
| $E_B$ (%) | 470 | | 450 | |
| Ret. of $E_B$ % | 93 | | 88 | |
| Heat Aged (70 h/150° C.) | | | | |
| $M_{100}$ (psi) (MPa) | 850 | 5.9 | 570 | 3.9 |
| $T_B$ (psi) (MPa) | 2550 | 17.6 | 2650 | 18.3 |
| $E_B$ (%) | 210 | | 305 | |
| % Change from Original | | | | |
| $M_{100}$ | +157 | | +54 | |
| $T_B$ | −19 | | −23 | |
| $E_B$ | −58 | | −40.8 | |

I claim:

1. A composition comprising an elastomeric chlorinated polyethylene containing 20 to 50 percent by weight chlorine, form 0.25 to 10 parts by weight per 100 parts by weight chlorinated polyethylene of a polyhydric alcohol having at least two hydroxyl groups in steric proximity to each other and a molecular weight of less than 600, from 0.3 to 5 parts by weight per 100 parts chlorinated polyethylene of an initiator which is an amine, quaternary ammonium compound, or quaternary phoaphonium compound, and from 0.75 to 3.0 parts by weight of a mercapto compound containing 2 to 4 mercapto groups and having a molecular weight of less than 500 is present per 100 parts by weight chlorinated polyethylene.

2. The composition of claim 1 wherein from 0.5 to 20 parts by weight of an acid acceptor is present per 100 parts chlorinated polyethylene.

3. The composition of claim 2 wherein from 0.75 to 3 parts by weight of the polyhydric alcohol are present per 100 parts by weight of the chlorinated polyethylene.

4. The composition of claim 3 wherein the polyhydric alcohol contains from 2 to 12 carbon atoms.

5. The composition of claim 4 wherein the polyhydric alcohol contains at least 2 hydroxyl groups which are in the 1,2-, b 1,3- or 1,4- positions with respect to each other.

6. The composition of claim 5 wherein the chlorinated polyethylene contains about 35 weight percent chlorine.

7. The composition of claim 1 wherein the initiator is a quanternary ammonium compound.

8. the composition of claim 1 wherein the initiator is quaternary phosphonium compound.

9. The composition of claim 1 wherein the initiator is an amine.

10. The composition of claim 6 wherein the mercapto compound is 2,5-dimercapto-1,3,4-thiadiazole.

* * * * *